United States Patent Office 2,773,877
Patented Dec. 11, 1956

2,773,877

ISONICOTINYL HYDRAZONE OF PYRUVIC ACID

Wilhelm Wenner, Upper Montclair, N. J., assignor to Hoffmann-La Roche Inc., Nutley, N. J., a corporation of New Jersey No Drawing. Application March 14, 1952,
Serial No. 276,705

1 Claim. (Cl. 260—295)

This application relates to novel compounds which are useful to combat tuberculosis. The invention embraces the compounds in the free base form as well as acid addition salts thereof.

The following example will serve to illustrate the invention:

Example 14 grams of isonicotinylhydrazine were dissolved in 200 cc. of water at 25° C. 10 grams of pyruvic acid were added, and in less than one minute crystals separated. They were filtered off after three hours and washed with water. The α-(isonicotinylhydrazono)propionic acid thus obtained melted at 213° C. This product can also be identified by the alternative nomenclatures 1-isonicotinyl-2-(1-carboxyethylidene)hydrazine or the isonicotinylhydrazone of pyruvic acid, and has the structural formula

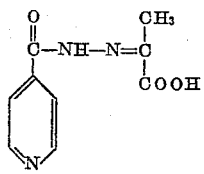

Where the aforesaid compound is obtained in the form of the free base, the latter can be readily converted to the acid addition salts on treatment with acids, for example, hydrochloric acid, hydrobromic acid, nitric acid, sulfuric acid, phosphoric acid, ethane sulfonic acid, tartaric acid, and the like. Where the compound is isolated in the form of acid addition salts, the latter can be converted to the free base by treatment with an alkali, for example, sodium hydroxide or ammonium hydroxide. It is to be understood that the claim is to be construed as also embracing salts of the base.

I claim:

The isonicotinyl hydrazone of pyruvic acid having the structural formula

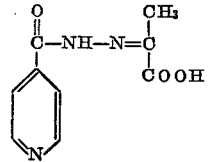

No references cited.